US009135547B2

(12) United States Patent
Forster

(10) Patent No.: US 9,135,547 B2
(45) Date of Patent: Sep. 15, 2015

(54) OPTICAL CONTROL OF RFID CHIPS

(75) Inventor: Ian J. Forster, Chelmsford (GB)

(73) Assignee: Avery Dennison Corporation, Glendale, CA (US)

( * ) Notice: Subject to any disclaimer, the term of this patent is extended or adjusted under 35 U.S.C. 154(b) by 1066 days.

(21) Appl. No.: 12/339,736

(22) Filed: Dec. 19, 2008

(65) Prior Publication Data

US 2010/0156640 A1 Jun. 24, 2010

(51) Int. Cl.

| | |
|---|---|
| *G08B 13/14* | (2006.01) |
| *G05B 19/00* | (2006.01) |
| *H04Q 5/22* | (2006.01) |
| *G05B 11/01* | (2006.01) |
| *G08C 19/12* | (2006.01) |
| *G08C 19/02* | (2006.01) |
| *G08B 1/08* | (2006.01) |

(Continued)

(52) U.S. Cl.
CPC ........ *G06K 19/07318* (2013.01); *G06K 7/0008* (2013.01); *G06K 7/1097* (2013.01); *G06K 19/0707* (2013.01); *G06K 19/0717* (2013.01); *G06K 19/0728* (2013.01)

(58) Field of Classification Search
CPC .......... G06K 19/0723; G06K 19/0728; G06K 19/0704; G06K 19/14; G06K 2017/0051; G06K 7/12; G06K 9/2036; G06K 9/3216; H04K 2203/20; H04L 2209/08; H04B 10/1143; G08B 13/1481; G01J 1/42; G01N 21/55; G01S 5/16; G06Q 20/34
USPC .......................................... 340/570–579, 3.4
See application file for complete search history.

(56) References Cited

U.S. PATENT DOCUMENTS

| | | | | |
|---|---|---|---|---|
| 3,893,767 | A | * | 7/1975 | Fulwyler et al. ................ 356/39 |
| 4,202,491 | A | * | 5/1980 | Suzuki .......................... 235/491 |

(Continued)

FOREIGN PATENT DOCUMENTS

| | | |
|---|---|---|
| EP | 1755074 | 2/2007 |
| EP | 1962232 | 8/2008 |

(Continued)

OTHER PUBLICATIONS

Author: Merriam Webster, Title: Defination of Polish(ed), Date (captured): Feb. 24, 2014, Pertinent Pages: Entire Document http://www.merriam-webster.com/dictionay/polish*

(Continued)

*Primary Examiner* — Steven Lim
*Assistant Examiner* — Muhammad Adnan
(74) *Attorney, Agent, or Firm* — Avery Dennison Retail Information Services LLC

(57) ABSTRACT

A radio frequency identification (RFID) system includes an RFID chip and a photo-active material disposed in proximity to the RFID chip. The photo-active material provides energy—in the form of optical frequency radiation—to the RFID chip that affects (e.g., enhances or inhibits) the performance of the RFID chip and its sensitivity to a reader signal. An infrared (IR) light illuminating a polished backside of an RFID chip enhances or inhibits a read rate of the RFID chip according to an intensity of the IR light. A method for controlling operation of RFID devices includes illuminating a number of RFID devices by a radio frequency (RF) reader field, the reader field being below an operational threshold of the RFID devices, and optically illuminating a selected one of the RFID devices so that the selected RFID device becomes operational and communicates to the RFID reader.

18 Claims, 2 Drawing Sheets

(51) Int. Cl.
*G06K 19/073* (2006.01)
*G06K 7/00* (2006.01)
*G06K 7/10* (2006.01)
*G06K 19/07* (2006.01)

(56) References Cited

U.S. PATENT DOCUMENTS

| | | | |
|---|---|---|---|
| 5,874,724 A | 2/1999 | Cato | |
| 6,335,685 B1* | 1/2002 | Schrott et al. | 340/572.1 |
| 6,677,852 B1 | 1/2004 | Landt | |
| 6,830,181 B1 | 12/2004 | Bennett | |
| 7,002,474 B2 | 2/2006 | De Souza et al. | |
| 7,199,719 B2* | 4/2007 | Steinberg | 340/572.8 |
| 7,217,937 B2* | 5/2007 | King | 250/458.1 |
| 7,229,023 B2 | 6/2007 | Raskar | |
| 7,295,117 B2 | 11/2007 | Forster et al. | |
| 7,362,258 B2* | 4/2008 | Kawabe et al. | 342/44 |
| 7,425,899 B2 | 9/2008 | Stewart et al. | |
| 7,513,431 B2* | 4/2009 | Chiu | 235/472.02 |
| 7,982,601 B2* | 7/2011 | Corrado et al. | 340/539.22 |
| 2004/0012496 A1 | 1/2004 | De Souza et al. | |
| 2004/0100834 A1 | 5/2004 | Waters | |
| 2005/0012616 A1 | 1/2005 | Forster et al. | |
| 2005/0029350 A1 | 2/2005 | Jusas et al. | |
| 2005/0150102 A1 | 7/2005 | Bosco et al. | |
| 2005/0212673 A1* | 9/2005 | Forster | 340/572.7 |
| 2005/0258939 A1* | 11/2005 | Kantrowitz et al. | 340/10.1 |
| 2006/0012387 A1 | 1/2006 | Shanks | |
| 2006/0055552 A1 | 3/2006 | Chung et al. | |
| 2006/0145710 A1 | 7/2006 | Puleston et al. | |
| 2006/0202802 A1* | 9/2006 | Seppa | 340/10.3 |
| 2006/0255140 A1 | 11/2006 | Jusas et al. | |
| 2006/0261951 A1 | 11/2006 | Koerner et al. | |
| 2007/0040683 A1* | 2/2007 | Oliver et al. | 340/572.1 |
| 2007/0132592 A1* | 6/2007 | Stewart et al. | 340/572.8 |
| 2008/0174436 A1* | 7/2008 | Landt et al. | 340/572.7 |
| 2009/0207582 A1* | 8/2009 | Dorsey et al. | 362/34 |

FOREIGN PATENT DOCUMENTS

| | | |
|---|---|---|
| GB | 2410151 | 7/2005 |
| JP | 2005196445 | 7/2005 |
| WO | 2010/019286 | 2/2010 |

OTHER PUBLICATIONS

Semitracks, Inc., What is Light Induced Voltage Alteration?, http://www.semitracks.com/reference/FA/die_level/optical/liva/liva.htm, Sep. 4, 2008, 12 pages.

International search report and written opinion issued in corresponding International application PCT/US2009/066973 dated Feb. 19, 2010.

Response to International search report and written opinion filed in corresponding International application PCT/US2009/066973 on May 4, 2010.

International preliminary report on patentability issued in corresponding International application PCT/US2009/066973 dated Jun. 30, 2011.

* cited by examiner

US 9,135,547 B2

OPTICAL CONTROL OF RFID CHIPS

TECHNICAL FIELD

The present invention relates generally to radio frequency identification (RFID) and, more particularly, to the use of optical energy and radiation in RFID applications.

BACKGROUND

Radio frequency identification (RFID) devices (e.g., RFID tags, RFID labels, RFID inlays, or RFID chips) find use in a wide variety of applications. For example, an RFID device typically may be associated with a retail product for identification and tracking purposes, e.g., attached to a package of the retail product for purposes such as supply chain management or electronic article surveillance (EAS).

An RFID device can provide an automatic identification function, for example, by storing data in an RFID tag or transponder. The data may be remotely retrieved through the use of an RFID reader that transmits a radio frequency (RF) signal to activate the RFID device. In general, an RFID device functions by responding to an RF signal that may supply power to the RFID device as well as communicate information to the RFID device. A number of potential applications for RFID, as well as other operations such as manufacturing and testing the devices, can depend on inhibiting the sensitivity of the RFID chip to being activated by the RF signal.

For example, one challenge associated with the manufacture of RFID devices is testing the RFID devices in a high-volume and cost-effective manner. During the manufacturing process, the RFID devices may be tested while located in close proximity to each other (e.g., RFID devices placed as inlays on a roll of tape or a sheet of labels, also referred to as a common carrier web) with each RFID device having its antenna mounted on the common carrier web and its integrated circuit mounted to the antenna. Selectively inhibiting activation of some of the devices can improve the accuracy of testing.

As a result, there is a need for systems and methods for controlling the activation of RFID devices.

SUMMARY

In one embodiment, a radio frequency identification (RFID) system includes an RFID chip and a photo-active material disposed in proximity to the RFID chip. The photo-active material provides energy in the form of optical frequency radiation to the RFID chip that enhances the sensitivity of the RFID chip to a reader signal.

In another embodiment, a radio frequency identification (RFID) system includes an RFID chip having a backside that is polished; and an infrared (IR) light illuminating the polished backside that enhances or inhibits a read rate of the RFID according to an intensity of the IR light.

In still another embodiment, a method for controlling operation of RFID devices includes transmitting a radio frequency (RF) reader field to a plurality of RFID devices, the reader field being below an operational threshold of the RFID devices; and optically illuminating a selected one of the plurality of RFID devices so that the selected RFID device becomes operational and communicates to the reader.

In yet another embodiment, a method for radio frequency identification (RFID) includes generating optical energy at a wavelength affecting operation of an RFID device via a photo-active material in proximity to an RFID chip of the RFID device; and reading the RFID chip under conditions produced by the photo-active material by transmitting an RF signal to the RFID device.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Embodiments of the present disclosure provide systems and methods for controlling the activation of radio frequency identification (RFID) devices, enabling a variety of applications of RFID such as chemical and biological remote sensing, locating and finding objects, electronic article surveillance (EAS), RFID product testing for manufacturing, and enhancing the performance of conventional RFID systems by, e.g., compensating for the conventional system's susceptibility to certain wavelengths of optical radiation. For example, in accordance with some embodiments, using optical radiation—such as infrared (IR) light—to control the activation of RFID chips, precise localization for activating or deactivating one chip among several closely neighboring chips may be achieved, enabling a number of applications such as precise RFID chip testing. Also, for example, in accordance with some embodiments, photo-chemically reactive or photo-chemically sensitive materials may be coated on, or otherwise associated with, an RFID chip to enable RFID sensing, e.g., of chemicals, biological materials, light or other phenomena. Also, for example, in accordance with some embodiments, photo-chemically reactive materials in association with an RFID chip may be used to enhance sensitivity of an RFID device that, for whatever reason, may be obscured from its RFID reader. For example, such a material could be used to increase the energy and, thus, the sensitivity of an RFID tag that is being concealed from its RFID reader in an attempt to thwart an EAS system. Additional examples in accordance with various embodiments are further described in what follows.

Figure 1:
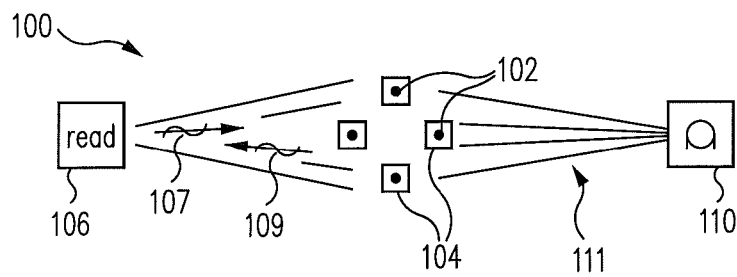
FIG. 1 is a system block diagram illustrating a radio frequency identification (RFID) system in accordance with an embodiment of the present invention.

FIG. 1 illustrates an RFID system 100 in accordance with one embodiment of the present disclosure. RFID system 100 may include a number of RFID devices 102,—e.g., RFID tags, labels, inlays, or transponders—attached, respectively, to a number of objects 104. Objects 104 may be any of a large variety of items for which an application of RFID techniques could be usefully applied, for example, retail products, arrays or rolls of label inlays, books in a library, vials in a biological laboratory, or cars on a toll road. RFID system 100 may include an RFID reader 106 that can communicate and control RFID devices 102 by transmitting radio frequency (RF) signals 107 to RFID devices 102 and receiving RF signals 109 from RFID devices 102. RF signals 109 may, for example, take the form of backscatter radiation. RF signals 107 may comprise an electro-magnetic field, referred to as the reader field, which may illuminate or irradiate RFID devices 102.

RFID devices 102 may also be illuminated optically (i.e., using light, which may be in the infrared to ultraviolet region of the electromagnetic radiation spectrum) by an optical illumination, or light, source 110. Light source 110 may comprise, for example, a laser or light emitting diode (LED) and may provide optical illumination 111 in the form of infrared radiation, i.e., light at wavelengths greater than approximately 800 nanometers (nm). RFID chips (e.g. RFID chip 202, see FIG. 2) may be especially sensitive—in terms of affecting the operation of the chip, e.g., either enhancing or inhibiting the chip's sensitivity to RF signals 107—to infrared light at a wavelength of 950 nm, which happens to be a wavelength commonly used in remote controls, for example. In some embodiments, light source 110 may also comprise, for example, the sun or artificial interior lighting, and illumination 111 may comprise natural sunlight, fluorescent light, or other artificial light.

In some alternative embodiments, light source 110 may comprise, for example, a photo-chemical light source, and illumination 111 may be provided by chemoluminescence. For example, light source 110 may comprise a glow stick, which may contain two chemical solutions isolated from each other in a plastic tube, e.g., a phenyl oxalate ester and fluorescent dye solution isolated from a hydrogen peroxide solution that is inside a glass vial inside the plastic tube. By breaking open the vial and mixing the peroxide with the phenyl oxalate ester, the hydrogen peroxide may oxidize the phenyl oxalate ester resulting in a phenol and an unstable peroxyacid ester. The peroxyacid ester may decompose resulting in an additional phenol and a cyclic peroxy compound, which may decompose to carbon dioxide, releasing energy that excites the fluorescent dye, which then de-excites by releasing a photon, the wavelength of the photon—the color of the emitted light—depending on the structure of the dye.

Figure 2:
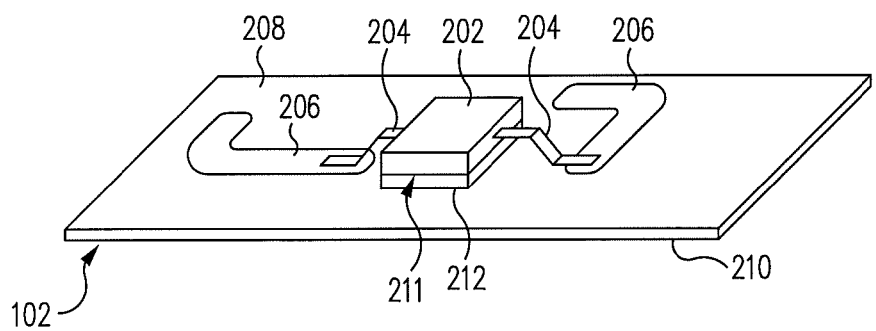
FIG. 2 is a perspective diagram illustrating an RFID device in accordance with an embodiment of the present invention.

FIG. 2 illustrates an RFID device 102 in accordance with an embodiment of the present invention. RFID device 102 may comprise an RFID chip 202. RFID chip 202 may be connected, e.g., by device leads 204 to an antenna 206. RFID chip 202 and antenna 206 may be mounted to a portion of a carrier web 208 to form an RFID inlay. The inlay may also comprise an adhesive backing 210, in which case RFID device 102 may be referred to as a "wet inlay".

RFID device 102 may further comprise a material 212 disposed on or near a backside 211 of RFID chip 202. For example, the backside 211 of chip 202 may be described as the substrate side of the chip away from the patterns of the chip. For example, material 212 may be coated on backside 211, adhered or otherwise attached to backside 211, or held in place mechanically, e.g., being supported by carrier web 208. Material 212 may be, for example, a photo-active material in the sense that material 212 may emit light energy in the optical part of the spectrum. The light energy emitted by photo-active material 212 may affect the operation of RFID chip 202, e.g., by enhancing the chip's RF sensitivity and power output level. In one embodiment, the backside 211 may be polished to improve susceptibility of RFID chip 202 to energy received from photo-active material 212. Photo-active material 212 may be a chemo-luminescent material, for example, as described above, that emits light energy as the result of a chemical reaction. Photo-active material 212 may also be, for example, a material that emits light energy in response to contact with a fluid (e.g., either gas or liquid).

In another example, photo-active material 212 may be a fluorescent material that continues to emit light energy for a period of time after being exposed to light, i.e., in response to exposure to light. Such an embodiment may be used for electronic article surveillance (EAS). For example, ambient store lighting or shelf lighting may pump energy into fluorescent photo-active material 212, which may be coated onto RFID chip 202. Then, for a period of several minutes after the tag has been taken off the shelf, and usually concealed (i.e., obscured from light), the light output of the fluorescent photo-active material 212 may provide additional energy to the RFID chip 202, increasing the probability that an RFID tag containing the RFID chip 202 will be detected. In another embodiment, RFID chip 202 may have a photovoltaic capability that can charge a storage capacitor from incident illumination like a shop's lighting to give the RFID chip 202 additional energy to enhance its sensitivity to being read, increasing its probability of detection.

In another example, photo-active material 212 may be a material that has a variable optical absorption affected by an environmental factor such as temperature, humidity, or length of time exposed to some chemical. Such a configuration of RFID device 102 may be useful, for example, as a temperature or other environmental condition sensor in that a sensed value of the environmental factor can be determined, e.g., by system 100, according to the difference in RFID chip 202 performance between being read (e.g., by RFID reader 106) without external optical illumination (e.g., no illumination provided by light source 110) and being read with external optical illumination (e.g., with some pre-determined intensity level of illumination provided by light source 110). In a similar embodiment, photo-active material 212 may exhibit a shift in adsorption frequency upon being affected by the environmental factor. In such an embodiment, RFID device 102 may be similarly used as an environmental sensor by reading the difference in performance of RFID chip 202 according to the frequency of illumination of photo-active material 212, photo-active material 212 being illuminated, for example, using a swept optical source (e.g., for light source 110) while reading RFID chip 202 (e.g., with RFID reader 106).

Figure 3:
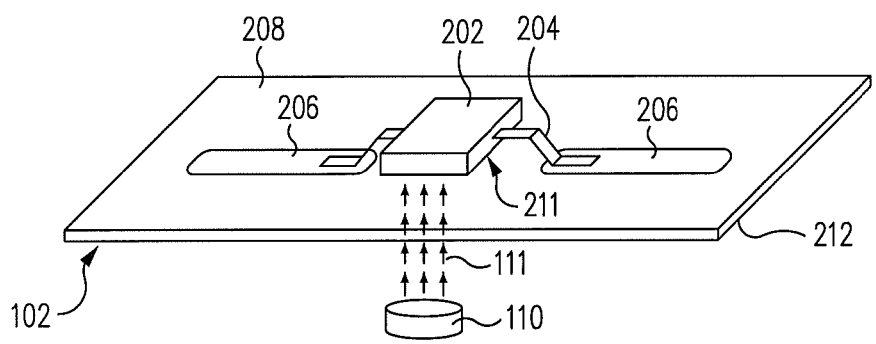
FIG. 3 is a perspective diagram illustrating an RFID device in accordance with another embodiment of the present invention.

FIG. 3 illustrates RFID device 102 in accordance with another embodiment of the present invention. RFID device 102 may comprise RFID chip 202 mounted to carrier web 208 with photo-active material 212 applied (e.g., printed or coated) on one or more surfaces of the carrier web 208, e.g., on a bottom surface as shown in FIG. 3. For example, photo-active material 212 may comprise an adhesive coating on the web carrier 208 or an ink printed on one or other side of the inlay formed by RFID device 102 and web carrier 208. In such an embodiment, photo-active material 212 (e.g., inlay adhesive, ink, or other substance) may include a specific organic chemical to absorb wavelengths of light to which the RFID chip 202 is sensitive in terms of inhibiting RFID chip response to being read. In one embodiment, photo-active material 212 (e.g., ink or adhesive) may be designed with a specific ability to block wavelengths of light that RFID chip 202 responds to so that labels, for example, can be made that do not suffer from performance degradation when exposed to bright, broadband optical illumination like sunlight.

As shown in FIG. 3, RFID device 102 may be situated so as to more readily accommodate illumination from light source 110, which may be, for example, an infrared LED. For example, infrared light at 950 nm and radiated above a certain level of intensity (e.g., that provided by an LED consuming 50 mA of current) may inhibit response from RFID chip 202 while infrared light at 950 nm and below a certain level of intensity (e.g., that provided by an LED consuming 10 mA of current) may enhance the response from RFID chip 202. Thus, to enhance response of the RFID chip 202, the IR light 111 may radiate from an LED light source 110 operating below a predetermined level of current at a wavelength that enhances a read rate from of the RFID chip 202 from the read rate with no IR illumination. Read rate, e.g., the number of times that an RFID chip can be read by a reader in a given period of time may be used as a measure of performance of the RFID chip—the higher the read rate, the better the performance, or sensitivity to being read, of the RFID chip. To increase the effectiveness of the optical illumination on performance—whether enhancing or inhibiting—backside 211 of the RFID chip 202 may be polished, and RFID chip 202 and light source 110 may be situated and oriented to provide illumination 111 more directly on backside 211 as shown in FIG. 3.

In one embodiment, for example, a scanning optical pattern illuminator can be used to find a pre-selected RFID tag. Light source 110 may be an LED or laser light source that can be scanned in a pattern to selectively illuminate a multitude of RFID devices 102, one at time. The RFID devices 102 may be, for example, RFID tags attached to books or items in a library, garments on a rack, or vials in biological laboratory. Reader 106 may be operated at an appropriate level (e.g., with lower RF energy incident on RFID devices 102) so that only the illuminated RFID tag, i.e., the one with enhanced sensitivity, may respond and be identified. Scanning of RFID tags may continue until the pre-selected RFID tag is found. In addition, if, for example, an IR laser is used to sensitize the RFID tags an additional, visible laser aimed identically with the IR laser may be used to illuminate and pinpoint the position of the desired RFID tag for a user of system 100 once the desired RFID tag is found.

Figure 4:
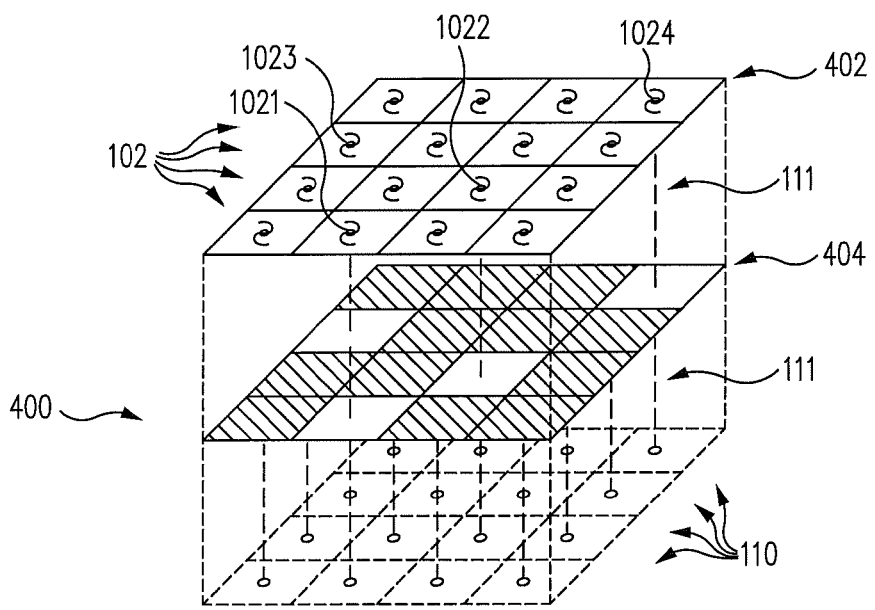
FIG. 4 is a perspective diagram illustrating an RFID system in accordance with an embodiment of the present invention.

FIG. 4 illustrates an RFID system 400 in accordance with an embodiment of the present invention. RFID system 400 may include an array 402 of RFID devices 102. Although a rectangular array 402 is shown in FIG. 4, array 402 could take other forms such as a tape of RFID devices 102 that can be packaged as a roll of tape, for example, of RFID inlays. System 400 may include a light source or plurality of light sources 110 as previously described. System 400 may also include a light/dark pattern 404. Light/dark pattern 404 may comprise a mask, as suggested by FIG. 4, that can control the amount and intensity of light reaching each individual RFID device 102 of array 402. For the pattern illustrated in FIG. 4, RFID devices 1021, 1022, 1023, and 1024 may be optically illuminated while the remainder of RFID devices 102 of array 402 remain unilluminated.

Light/dark pattern 404 may be implemented in a variety of ways. For example, light sources 110 may form an array with each of the plurality of light sources 110 being individually controllable so that light/dark pattern 404 can be varied electronically so that the amount and intensity of light reaching each individual RFID device 102 of array 402 is controllable. Light/dark pattern 404 also may be implemented, for example, as a mask that may be moveable with respect to array 402 so that the amount and intensity of light reaching each individual RFID device 102 of array 402 is controllable. Also for example, light/dark pattern 404 may be implemented as a controllable mask, e.g. using liquid crystal or electro-mechanical means, so that the amount and intensity of light reaching each individual RFID device 102 of array 402 is controllable. Such implementations could be useful, for example, in an RFID printer.

By individually controlling the light reaching each RFID device 102 of array 402, the performance enhancing effect of certain wavelengths of light (e.g., 950 nm) on RFID chips (e.g., RFID chip 202 of an RFID device 102) may be exploited in a number of ways—such as testing or printing individual RFID chips of an array or roll of tape during the manufacturing process. For example, the incident optical energy of illumination 111 may provide an additional source of energy to the RFID chip 202, allowing it to operate with lower incident RF energy. Thus, all the RFID devices 102 of array 402 may be illuminated by an RF reader field (e.g., signals 107 from RFID reader 106) below their operational limit (e.g., below a threshold at which the RFID chip 202 would operate without the optical illumination) so that only the illuminated RFID device 102 is capable of communicating with RFID reader 106 as the illuminated RFID device 102 has supplemental energy supplied by the optical source 110. Variations of the technique can include: 1) constant (i.e., unmodulated) optical illumination providing partial energy, modulated RF providing partial energy and commands; 2) constant optical illumination providing energy and modulated RF illumination providing commands; 3) modulated optical illumination providing partial energy and commands and constant RF illumination providing partial energy; 4) modulated optical illumination providing commands and constant RF illumination providing energy; and 5) modulated optical illumination providing commands and modulated RF illumination providing energy and commands.

In variation (4), all the RFID devices 102 of array 402 could be receiving energy from the RF reader field above their threshold but only the ones which have an incident modulated optical signal to provide commands would respond, so precise control of the RF reader field (RF illumination) is not required. Additional design considerations may include providing optical sensitivity only at specific light wavelengths and having a filter on the chip surface (e.g., backside 211) which stops charge generation in the wrong areas but allows access to certain areas.

In variation (5), the optical illumination (e.g., optical illumination 111) may be modulated by a specific signal designed, for example, to inhibit the ability of RFID chip 202 to decode RF command sequences, and the optical signal may be timed and generated in conjunction with the RF signal 107 from RF reader 106. By using a low modulation depth RF signal from reader 106, the signal (e.g., RF signal 107) in the detector of RFID chip 202 may have adequate direct current (DC) power but a smaller, and hence more easily controlled, signal component so that optical illumination 111 can control the ability of RFID chip 202 to receive RF commands (e.g., from RF signal 107). For example, system 400 may use a 5% depth RF signal (e.g., one logic state would be represented by 100% RF power, the other by 95%) so that optical illumination III may control RFID chip 202 signal reception using less effect than would be required to control provision of power to RFID chip 202—such as a prior art method which controls power to an RFID chip by using optical illumination to increase leakage current of the chip so that the chip power threshold is increased.

For example, variation (5) may be used with system 400 in manufacturing to test an array 402 of RFID tags 102 each comprising an RFID chip 202. Array 402 may be illuminated by a single RFID reader 106, sending a command and power to all the RFID tags 102 and RFID chips 202. All the RFID tags 102 may be above their sensitivity threshold to RF signal 107 because any incident optical illumination 111 does not cause any RFID chip 202 to be unable to successfully power up. Although all RFID chips 202 in array 402 may have enough RF energy for responding to RFID reader 106 regardless of whether optical illumination is present at each chip, however, the optical illumination 111 may generate an interfering signal that causes an error—which can be only a single bit, for example, in the command received—such that each optically illuminated RFID chip 202, although powered, does not respond to the RFID reader 106. Thus, for one selected RFID tag 102 that is not optically illuminated (e.g., illumination 111 obscured by a dark element of light/dark pattern 404) only the RFID chip 202 for the selected, unilluminated RFID tag 102 may respond and be tested. Furthermore, although selecting a single RFID tag 102 at a time from array 402 may be useful for some applications, any subset of array 402 of RFID tags 102 may be selected at one time, as suggested by the example illustrated in FIG. 4.

In another embodiment, the performance enhancing or inhibiting effect of the light reaching each RFID device 102 of array 402 may be individually controlled using a chemical light source (e.g., photo-active material 212) attached to the chip surface (e.g., backside 211) by printing or other means. The emission of light from photo-active material 212 being in response to a specific chemical event—for example the presence or absence of a substance, or the reaction of an antibody to a biological structure, the performance enhancing or inhibiting effect of certain wavelengths of light from a photo-active material on RFID chips can also be exploited in a number of ways.

For example, consider an array (such as array 402) of 100 RFID chips 202 in a 10×10 layout. The RFID chips 202 may be combined at wafer level or may be connected with a conducting ink into one 'big' chip, referred to as a connected array of chips. For example, by linking lines of 10 chips in series (the total capacitance is now 1/10 a single chip) and then putting all 10 lines of 10 chips in parallel (the total capacitance is now 10×1/10=1, the same as a single chip). Each RFID chip 202 of the connected array may have a different diagnostic 'blob' of photo-active material 212 ink-jetted onto the surface (e.g., backside 211), which may either glow as a result of a chemical reaction or fluoresce under UV light at a frequency which changes the RFID chip response. By reading (e.g., using RFID reader 106) the connected array (e.g., RFID chip 202) response at different power levels, a map of the illumination level can be generated, and the illumination level can be correlated with a sensed result, e.g., an indication of the result of the chemical reaction or the fluorescence under UV light.

In another embodiment, the RFID reader 106 may employ magnetic near field techniques, (as opposed, e.g., to far field techniques using RF signal radiation) so that the connected array could be read even when the connected array is inside a person, enabling a disposable diagnostic test element for medical uses. In another embodiment, unwanted chemicals can be monitored in water or other places where a disposable sensor (e.g., a connected array of RFID chips 202) may be useful. In another embodiment, an RFID label, which reacts to the presence of biological agents (e.g., Methicillin-resistant *Staphylococcus aureus* (MRSA), can be designed to be applied on surfaces (e.g., doors) in a hospital so that the effectiveness of cleaning and sterilization regimes in even difficult to reach places may be monitored using a hand-held RFID reader each day.

Figure 5:
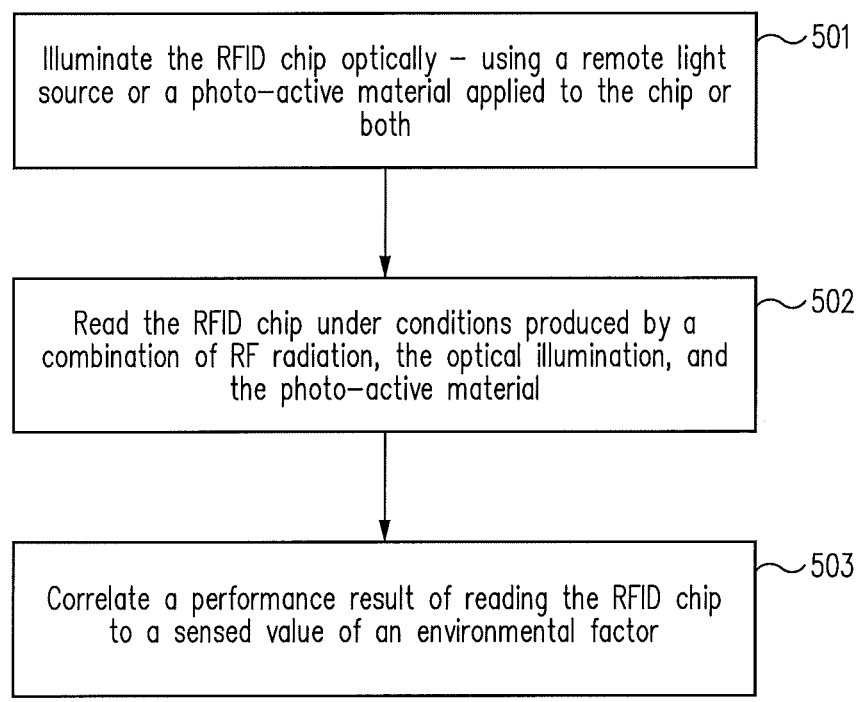
FIG. 5 is a flowchart for a method of using optical illumination in conjunction with an RFID system in accordance with an embodiment of the present invention.

FIG. 5 illustrates a method of using optical illumination in conjunction with an RFID system in accordance with an embodiment of the present invention. The method of FIG. 5 may operate an RFID chip (e.g., RFID chip 202, RFID device 201, or an array 402 of RFID chips) in the presence of photo-active material (e.g., photo-active material 212 either positioned near or attached to the RFID chip 202).

At block 501, the method of FIG. 5 may illuminate the chip optically. For example, an LED or laser light source 110 may illuminate RFID chip 202. Light source 110 may be part of a scanning apparatus that localizes illumination to individual elements of an array such as array 402; light source 110 may be artificial residential or commercial lighting; or light source 110 may be the sun, for example. Optical illumination may also be provided at block 501 by a photo-active material (e.g., photo-active material 212) disposed near the RFID chip 202. In some embodiments, optical illumination may be provided by a combination of external light acting on photo-active material 212 and photon energy internally generated by photo-active material 212 disposed near or in contact with the RFID chip 202. Optical illumination of the RFID chip 202 may generate optical energy at a wavelength (e.g. 950 nm) affecting operation of the RFID device (e.g., RFID device 102).

At block 502, the method of FIG. 5 may read the RFID chip 202 under conditions produced by the optical illumination and photo-active material. For example, an RFID reader 106 may transmit RF signals 107 to the chip, near field techniques may be used, and the chip may communicate to the reader via signals 109, which may comprise, for example, backscatter radiation. Alternatively, as described above, various combinations of modulating or not modulating the RF reader field energy and the optical energy of illumination may be used to communicate with the RFID chip.

At block 503, the method of FIG. 5 may correlate a performance result of reading the RFID chip (e.g. measuring the read rate or more simply whether a selected chip responds or not) to a sensed value of an environmental factor such as presence or absence of light, temperature, chemical reactions, or biological material. The correlation result of reading the chip may also be used for other applications such as electronic article surveillance, finding and locating RFID-tagged objects, and testing and printing multiple closely spaced RFID devices for manufacturing RFID tags and inlays.

Embodiments described above illustrate but do not limit the invention. It should also be understood that numerous modifications and variations are possible in accordance with the principles of the present invention. Accordingly, the scope of the invention is defined only by the following claims.

I claim:

1. A method for radio frequency identification (RFID), comprising:
   generating optical energy at a wavelength affecting operation of an RFID device via a photo-active material in proximity to an RFID chip of the RFID device wherein the RFID chip has a backside that is polished wherein the photo-active material is a fluorescent material that emits light energy in response to exposure to light; and
   reading the RFID chip under conditions produced by the photo-active material by transmitting an RF signal to the RFID device
   wherein the photo-active material is a material that has a variable optical absorption affected by an environmental factor; and further comprising:
  reading the RFID chip without infrared illumination of the photo-active material;
  reading the RFID chip with infrared illumination of the photo-active material wherein an infrared illumination source is configured to illuminate the backside of the RFID chip; and
  correlating a difference in performance of reading the RFID chip with and without infrared illumination to a sensed value of the environmental factor.

2. The method of claim 1:
wherein a read rate of the RFID chip is enhanced or inhibited.

3. The method of claim 1, wherein:
the photo-active material is disposed on a backside of the RFID chip.

4. The method of claim 1, wherein:
the photo-active material is a material that emits light energy in response to a presence of a fluid in contact with the material.

5. The method of claim 1, wherein:
a difference in RFID chip performance between being read without external optical illumination and being read with external optical illumination represents a sensed value of the environmental factor by the system.

6. The method of claim 1, wherein:
the photo-active material is coated on the polished backside of the RFID chip.

7. The method of claim 1, further comprising a web carrier, wherein:
  the RFID chip is included in a wet inlay of the web carrier, the wet inlay comprising an adhesive;
  the inlay adhesive comprises the photo-active material; and
  the inlay adhesive includes a specific organic chemical to absorb a wavelength of light to which the RFID chip is sensitive in terms of inhibiting RFID chip response to being read.

8. The method of claim 1 wherein, to enhance response of the RFID chip, the IR light radiates from an LED operating below a predetermined level of current at a wavelength that enhances a read rate from of the RFID chip from that with no IR illumination.

9. The method of claim 8, wherein the LED operates at a current level below 10 mA and at a wavelength of 950 nm.

10. The method of claim 1, wherein a light-dark pattern is used to control the intensity of the IR light illuminating the RFID chip.

11. The method of claim 1, wherein a scanning optical pattern illuminator is used to find a pre-selected RFID device.

12. The method of claim 1, further comprising:
  illuminating the RFID device by a radio frequency (RF) reader field; and
  optically illuminating the backside of the RFID device to change the sensitivity of the RFID chip of the RFID device so that the selected RFID device becomes operational and communicates to the reader in response to the readers' RF signals.

13. The method of claim 12, wherein:
optically illuminating comprises providing a constant level of illumination that supplies a first partial energy to the selected-RFID device; and
transmitting the RF reader field comprises transmitting a modulated RF reader field that provides commands and supplies a second partial energy to the selected RFID device.

14. The method of claim 12, wherein:
optically illuminating comprises providing a constant level of illumination that supplies energy to the selected RFID device; and
transmitting the RF reader field comprises transmitting a modulated RF reader field that provides commands to the selected RFID device.

15. The method of claim 12, wherein:
optically illuminating comprises providing a modulated optical illumination that provides commands and supplies a first partial energy to the selected RFID device; and
transmitting the RF reader field comprises transmitting a constant RF reader field that supplies a second partial energy to the selected RFID device.

16. The method of claim 12, wherein:
optically illuminating comprises providing a modulated optical illumination that provides commands to the selected RFID device; and
transmitting the RF reader field comprises transmitting a constant RF reader field that supplies energy to the selected RFID device.

17. The method of claim 12, wherein optically illuminating comprises providing optical energy from a scanning apparatus, and further comprising:
  attempting, each time the scanner locates the RFID device, to read the located RFID device; and selecting the located RFID device which responds to the read attempt when located.

18. The method of claim 1, wherein:
  the photo-active material is a fluorescent material that stores energy from ambient lighting;
  the photo-active material provides optical energy to the RFID chip for a period of time during which the RFID device is obscured from ambient lighting so that the RFID device has a higher sensitivity to being read during the period of time.

* * * * *